No. 790,470. PATENTED MAY 23, 1905.
R. L. WOODRUM & W. A. BROWN.
METHOD OF WELDING BOILER TUBES.
APPLICATION FILED NOV. 30, 1904.
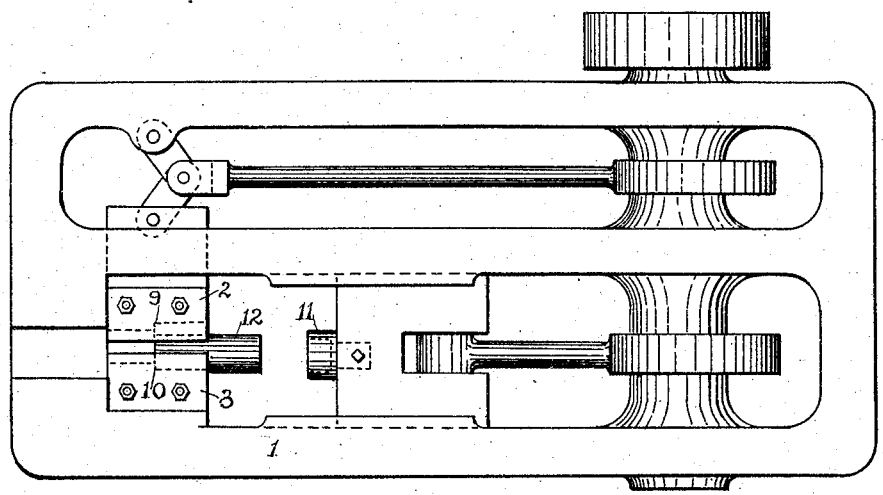
Fig. 1.
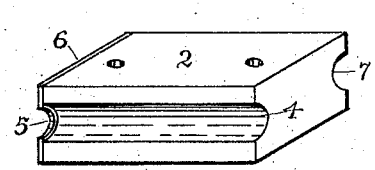
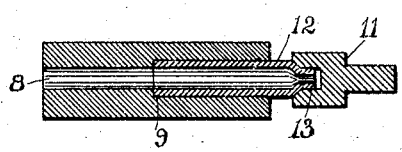
Fig. 3.
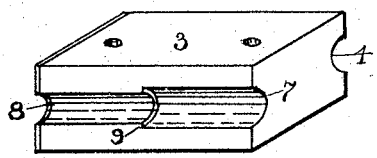
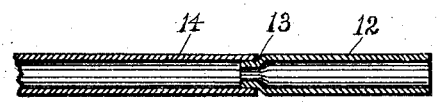
Fig. 2.     Fig. 4.
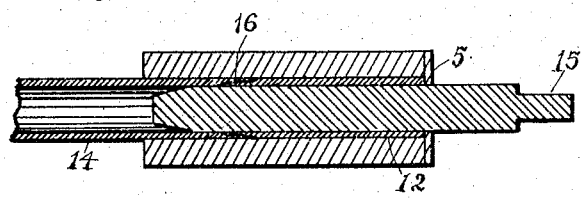
Fig. 5.
WITNESSES:
Marion G. Fisher
Dudley T. Fisher
R. L. Woodrum
W. A. Brown    INVENTORS
BY
Geo. W. Rightmire
ATTORNEY.

No. 790,470. Patented May 23, 1905.

UNITED STATES PATENT OFFICE.

ROBERT L. WOODRUM AND WILLIAM A. BROWN, OF MIDDLEPORT, OHIO.

METHOD OF WELDING BOILER-TUBES.

SPECIFICATION forming part of Letters Patent No. 790,470, dated May 23, 1905.

Application filed November 30, 1904. Serial No. 234,832.

*To all whom it may concern:*

Be it known that we, ROBERT L. WOODRUM and WILLIAM A. BROWN, citizens of the United States, residing at Middleport, in the county of Meigs and State of Ohio, have invented certain new and useful Improvements in Methods of Welding Boiler-Tubes, of which the following is a specification.

Our invention has reference to welding tubes, especially to the welding of ends on boiler-flues; and it consists in an improved method of performing the work.

As is well known in the art, the boiler-flue and the end to be welded on are first scarfed, then locked together, and brought to a welding heat, whereupon they are inserted between dies, the upper die being pneumatically operated, and the welding is performed by a hammering process. This is slow and usually results in an increased thickness of the flue at the point of welding. Frequently also a ridge or irregularity is produced in the interior of the tube which obstructs the passage of cinders and gases when the flues are in service. Further, by this method the welding cannot be accomplished throughout simultaneously and is not, therefore, so durable as it would be if the process could be completed by one operation.

The advantages of our improved method are that the welding is performed by a single stroke of a plunger, thereby saving time; an absolutely uniform diameter, both internal and external, is maintained in the flue; the safe end is swaged and a long lap-weld is thereby produced, which is recognized as the most effective form of weld for this class of work; a perfectly smooth surface is left on the interior of the flue, thereby creating a free passage for the gases and cinders incident to service.

A further advantage is that, if desired, the apparatus may be adjusted to produce an increase in the thickness of the walls of the flue at the point of weld.

It is readily seen that our invention may be utilized in the welding of tubes for other purposes, and the claim herein is not intended to restrict the same to the welding of boiler-flues.

The devices of which we make use may be applied to any suitable heading or forging machine now in use, and in the accompanying drawings a conventional machine is shown for that purpose.

Our invention will be fully described hereinafter, and particularly pointed out in the claim.

In the drawings, Figure 1 is a plan view of a conventional heading-machine, showing dies holding a safe end and the swaging-tool in position for the thrust. Fig. 2 represents the dies for welding in perspective. Fig. 3 shows the swaging-tool in longitudinal section in the operation of swaging the safe end. Fig. 4 shows in longitudinal cross-section the safe end swaged and locked onto the flue. Fig. 5 shows the plunger being forced into the tubes.

Similar numerals refer to the same parts throughout.

In the drawings, 1 is a conventional heading or forging machine carrying the dies 2 3. Each die is provided on one face with a channel 4, extending throughout its length, and at one end of said face is a shoulder 5, formed by securing to the die a plate 6, which extends above the channel. When these corresponding faces are brought together over a tube, the shoulder is continuous and prevents the tube from being withdrawn by the plunger after the stroke which completes the welding process is ended. On its opposite face each die is provided with a channel 7, extending through a portion of its length. The remainder thereof is a channel of less depth, 8, through which a tool may be inserted for handling the tube. When these corresponding faces of the dies are brought together over a tube, one end of the tube is in contact with the shoulders 9 10 of the channels. When the swaging-tool 11 is thrust upon the tube 12, the latter is held against longitudinal movement by said shoulders. The end is swaged so as to reduce the diameter to an extent equal to twice the thickness of the tube-walls. The reduced end 13 is then locked on the flue 14 and the overlapping parts brought to a welding heat. The dies are then reversed to bring the channels 4 together, and the heated tube is placed between them and clamped securely. The plunger is then forced through, as shown in Fig. 5, and the parts are forced together into an organic union at all points at practically the same instant. Upon completing the stroke and withdrawing the plunger the tube is retained by the shoulder 5. In producing the weld the walls of the tube are preserved of the same thickness, which causes much elongation of the overlapping parts, as shown at 16. In the drawings opposite faces of the two dies are shown, for the reason that only two die-pieces are used to perform the work, thereby accomplishing the end sought with a saving of material. It is apparent that the same end could be accomplished if four dies were used instead of two.

In using our improved method the safe end to be welded onto the flue is first swaged by a single stroke of the machine. It is then locked to the flue and the whole brought to a welding heat in any of the well-known ways. Thereupon the heated tubes are placed between the welding-dies, which are firmly secured against movement by clamping, and the plunger is forced through by one forward stroke and withdrawn upon the return. The tubes are held against lateral expansion by the dies, and a uniform exterior results, while the interior is left perfectly smooth and uniform. The weld obtained is a long lap, which is recognized as the most effective for boiler-flue work. Both parts of the operation are performed with great speed, since only a forward and a reverse movement are required in each case. This results in much saving of time and a consequent corresponding reduction of cost. Pressure is brought to bear both on the outside and inside of the tube and safe end simultaneously and the welding performed at all points at almost the same instant of time, while the heat is uniform throughout. It is apparent that this method obtains a weld of the same degree of coalescence in all its parts, which result cannot be obtained by the methods now in use on account of the necessary cooling during the process of hammering. A tube welded by our method is therefore very unlikely to show weakness at any point. A lodgment of particles of cinder inside the tube causes rapid deterioration at such points, and in the present methods of flue-welding ridges or protuberances are very frequently produced which furnish such lodging-places and also interpose an obstacle to the free passage of gases. The effect of the latter is to deteriorate the flue, and if obstructed the effect is increased. Our method avoids these disadvantages by rendering ridges or protuberances impossible and always results in a smooth and uniform interior. Moreover, if for any reason it is desired to increase the thickness of the walls at the point of welding the dies and plunger may be relatively adjusted, so as easily to accomplish this result.

The foregoing description shows that our devices are simple and devoid of parts likely to be easily deranged, and the advantages of our method over those now in use are obvious.

What we claim as new, and desire to secure by Letters Patent, is—

The method of welding ends on boiler-tubes, consisting in swaging down one extremity of the end, then locking the end on a boiler-tube and bringing the whole to welding heat, then positioning the same in holding devices and forcing a plunger into the tubes while at welding heat.

In testimony whereof we affix our signatures in presence of two witnesses.

R. L. WOODRUM.
W. A. BROWN.

Witnesses:
JOHN B. DOWNING, Jr.,
M. R. DOWNING.